Sept 10, 1957  J. M. ROBINSON  2,805,850
SLIDING HANDLE LEVERAGE WEIGHING DEVICE
Filed Oct. 1, 1954

INVENTOR.
JAMES M. ROBINSON,
BY
McMorrow, Berman + Davidson
ATTORNEYS.

United States Patent Office 2,805,850
Patented Sept. 10, 1957

2,805,850

SLIDING HANDLE LEVERAGE WEIGHING DEVICE

James M. Robinson, Cary, N. C.

Application October 1, 1954, Serial No. 459,761

1 Claim. (Cl. 265—53)

The present invention relates generally to weighing devices and specifically to a portable weighing device incorporated in a knife structure including a blade and a sliding handle.

The principal object of the present invention is to provide a portable weighing device or beam scale in the form of a blade having other uses such as carving, skinning, scaling fish, or the like.

Another object of the present invention is to provide a collapsible weighing device or beam scale in the form of a blade and having a holding element pivotally connected thereto, the holding element being held on the handle portion of the knife when not in use as a scale.

A further object of the present invention is to provide a portable and collapsible weighing device or beam scale in the form of a blade and one having a plurality of notches on one side of the blade at a spaced distance from the hilt of the blade, each of the notches providing means for hanging a fish or animal carcass to be weighed.

A still further object of the present invention is to provide a collapsible and portable weighing device or beam scale in the form of a blade, which forms a sliding weight by means of which the weighing capacity of the device may be varied.

Yet another object of the present invention is to provide a collapsible and portable weighing device or beam scale in the form of a blade having a weighted handle slidable upon the tang portion of the blade with indicia on the tang cooperable with an indicator on the handle to indicate the weight of a carcass of an animal or fish hung on the blade portion of the blade.

An additional object of the present invention is to provide a combination blade and weighing device of sturdy and rugged contruction and one in which the handle locks on the tang of the blade to prevent accidental loss, and one which also has means to prevent the removal of the sliding handle from the tang of the blade.

These and other objects and advantages of the present invention will be fully apparent from the following description when taken in conjunction with the annexed drawings, in which.

Figure 1:
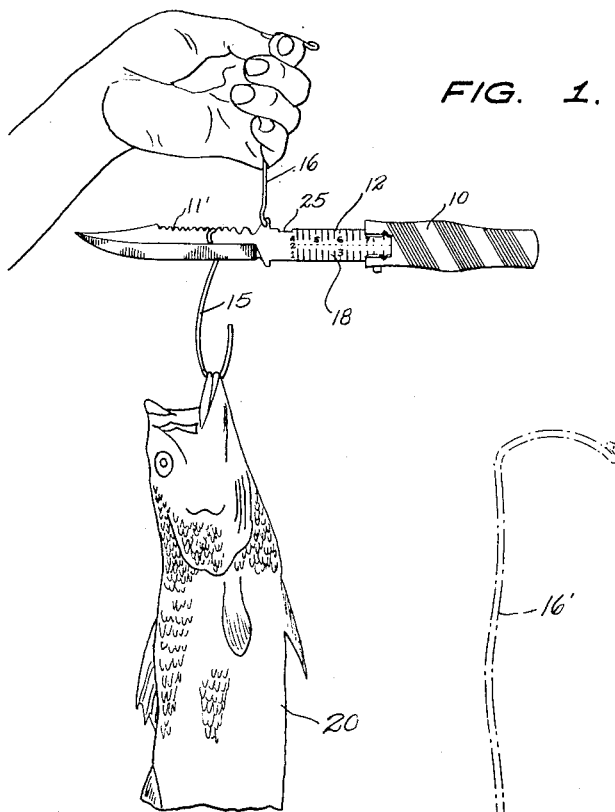
Figure 1 is a view in elevation of the present invention in use weighing the carcass of a fish.
Figure 4:
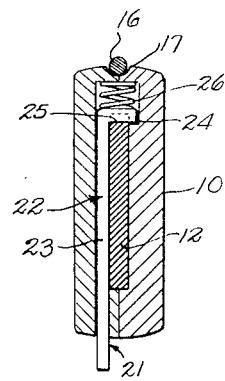
Figure 4 is an end view in cross section on line 4—4 of Figure 2.

Referring in greater detail to the drawing in which like numerals indicate like parts throughout the several views, the invention is seen to consist of a knife body having a handle 10 formed with one open end into which one end portion 12 of a blade 11 slidably extends, the blade 11 being connected to the handle 10 for extensile and contractile movement.

The blade 11 is formed with a plurality of serrations 11' arranged in spaced relation along one of the longitudinal edges which serrations serve as a means for scraping a fish. This same one longitudinal edge of the blade 11 also has a plurality of notches 13, each of which has an indicium 14 to indicate the position at which a hook 15 may be supported for the purpose of weighing a fish carcass, as shown in Figure 1. One of the notches 13 carries the numeral 1, another of the notches carries the numeral 2, and still another of the notches carries the numeral 4.

A bail or holding element 16 is pivotally connected to the hilt of the blade or that portion of the blade adjacent to the open end of the handle when in non-extended or contractile position. The bail or holding element 16 in its closed and carrying position fits into a groove 17 formed in one longitudinal edge and in the end of the handle 10. The holding element 16 snaps into the groove 17, and extends upwardly at a right angle to the blade and handle as shown in dotted lines at 16' in Figure 2.

Figure 2:
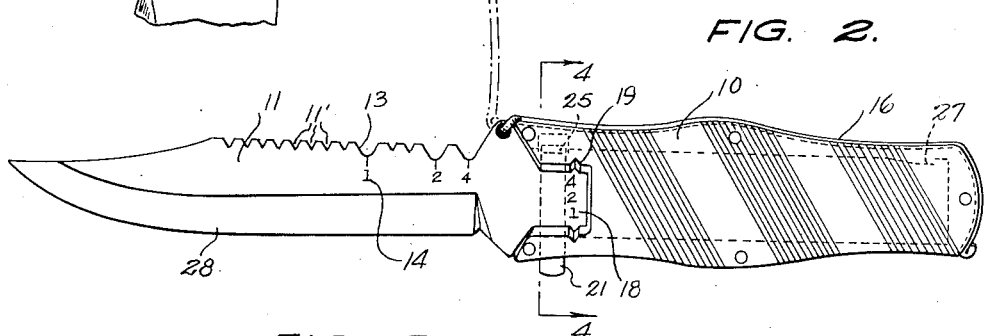
Figure 2 is an enlarged view in elevation of the present invention.
Figure 3:
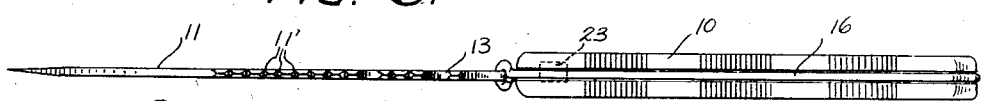
Figure 3 is a top plan view.
Figure 5:
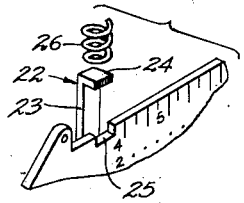
Figure 5 is an exploded perspective view of the latch and the associated notch in the blade.

The tang of the blade or that one end portion 12 which extends into the open end of the handle 10 is also provided with three scales indicated by the numeral 18 and arranged in three rows, the respective rows being indicated by the numerals 1, 2 and 4, as clearly shown in Figure 2. The handle 10 inwardly of its open end has an arrow or notch 19 to indicate the zero pound for the scales. With the knife 11 in it extensile movement position, as in Figure 1, a fish carcass weighing between 1 and 2 pounds may be weighed by placing the hook 15 carrying it in the notch 13 indicated by the numeral 1, and then reading the weight by reference to the scale indicated by the numeral 1 on the end portion 12 of the blade 11. For weighing a fish carcass of a weight from 2 pounds to less than 4 pounds, the hook 15 carrying it is placed in the notch 13 carrying the numeral 2, and then reading the weight by reference to the scale in the form of spaced dots and indicated by the numeral 2 on the end portion 12 of the blade 11. For weighing a fish carcass of a weight in excess of 4 pounds, the hook 15 carrying it is placed in the notch 13 carrying the numeral 4, and then reading the weight by reference to the scale indicated by the numeral 4 on the end portion 12 of the blade 11.

A latch 21 is carried by the handle 10 adjacent the open end thereof and is in the form of an L-shaped bar 22 having its longer leg 23 extending through the handle 10 with its shorter leg 24 overlying the one edge of the tang or one end portion 12 of the blade 11. A detent notch 25 is formed in the upper longitudinal edge of the tang or one end portion 12 of the blade into which the leg 24 slips for holding the handle 10 in its contractile position on the blade 11. A spring 26 within the handle 10 biases the leg 24 of the bar 22 into the detent notch 25. A stop detent 27 at the other end of the one end portion 12 of the blade 11 engages the shorter leg 24 of the bar 22 when the blade 11 is in its extensile position. The stop detent 27 prevents the accidental loss of the handle 10 from the blade 11 and limits the extensile movement of the one end portion 12 out of the handle 10. The longer leg 23 of the bar 22 projects outwardly a short distance from the handle 10 to form a releasable means for unlocking the handle from its positions on the blade 11.

The blade 11 is formed with a cutting edge 28 for its usual use as a hunting or fishing knife.

While only a single embodiment of the present invention has been here illustrated and described, it is believed that other embodiments may be made and practiced within the scope of the appended claim without departing from the spirit of the invention.

What is claimed is:

A weighing device comprising a handle having one end open, a blade having one end portion extending slidably into the open end of said handle and connected to said handle for extensile and contractile movement, there being a plurality of notches arranged in spaced relation along one of the longitudinal edges of said blade, each of said notches being adapted to suspendingly support a suspension element to which is to be secured a carcass to be weighed, a holding element having one end pivotally connected to the portion of said blade adjacent to the open end of said handle, and a releasable latch means carried by said handle adjacent the open end thereof engageable with detent means on each end of said end portion of said blade for alternatively holding said blade in its contractile position or limiting the extensile movement of said blade from said handle.

References Cited in the file of this patent
UNITED STATES PATENTS

| | | |
|---|---|---|
| 490,507 | Sevier | Jan. 24, 1893 |
| 809,602 | Barakat | Jan. 9, 1906 |
| 1,080,771 | Meyer | Dec. 9, 1913 |
| 2,186,256 | McClain | Jan. 9, 1940 |
| 2,230,341 | Szasz | Feb. 4, 1941 |
| 2,330,746 | Robinson | Sept. 28, 1943 |